United States Patent
Kraus et al.

(10) Patent No.: US 12,516,253 B2
(45) Date of Patent: Jan. 6, 2026

(54) METHOD FOR CREATING CRUDE OIL SYNTHESIZED FLUID HAVING SURFACTANT AND DEMULSIFICATION PROPERTIES

(71) Applicant: The Texas A&M University System, College Station, TX (US)

(72) Inventors: Jamie Kraus, College Station, TX (US); David Staack, College Station, TX (US); Howard Jemison, Houston, TX (US)

(73) Assignees: THE TEXAS A&M UNIVERSITY SYSTEM, College Station, TX (US); LTEOIL LLC, Houston, TX (US)

( * ) Notice: Subject to any disclaimer, the term of this patent is extended or adjusted under 35 U.S.C. 154(b) by 0 days.

(21) Appl. No.: 18/901,363

(22) Filed: Sep. 30, 2024

(65) Prior Publication Data
US 2025/0019598 A1 Jan. 16, 2025

Related U.S. Application Data

(62) Division of application No. 18/320,872, filed on May 19, 2023, now Pat. No. 12,104,126.
(Continued)

(51) Int. Cl.
*E21B 43/40* (2006.01)
*B01J 19/00* (2006.01)
(Continued)

(52) U.S. Cl.
CPC ........... *C10G 33/02* (2013.01); *B01J 19/004* (2013.01); *B01J 19/088* (2013.01); *C09K 8/584* (2013.01);
(Continued)

(58) Field of Classification Search
CPC .................. C09K 8/584; E21B 43/40
(Continued)

(56) References Cited

U.S. PATENT DOCUMENTS

2015/0291456 A1\* 10/2015 Findikoglu ............. B03C 11/00
    210/243
2018/0178184 A1\* 6/2018 Holland .................... B03C 1/28
(Continued)

FOREIGN PATENT DOCUMENTS

WO WO-2021/188650 A1 9/2021

OTHER PUBLICATIONS

Adkins, Kalissa Elspeth; "Plasma Processing of Oils Using a Corona Reactor," Thesis, Master of Science, Texas A&M University, Dec. 2014.
(Continued)

*Primary Examiner* — William D Hutton, Jr.
*Assistant Examiner* — Ashish K Varma
(74) *Attorney, Agent, or Firm* — Foley & Lardner LLP

(57) ABSTRACT

A high voltage discharge generating a plasma wave front is disposed within a headspace over an oil-containing liquid in order to create various chemical changes within the headspace, and ultimately within the liquid in order to inactivate various microbes, synthesize new chemicals, speed separation of a mixture, and aid in oil extraction. Such a discharge may be repeated at an optimum duration and duty-cycle to maximize the chemical effects of the non-equilibrium plasma at a substantially lower temperature than for an equilibrium plasma.

20 Claims, 10 Drawing Sheets

Related U.S. Application Data

(60) Provisional application No. 63/344,374, filed on May 20, 2022.

(51) Int. Cl.
*B01J 19/08* (2006.01)
*C09K 8/584* (2006.01)
*C10G 33/02* (2006.01)
*C10G 33/04* (2006.01)
*C10G 33/08* (2006.01)

(52) U.S. Cl.
CPC ............. *C10G 33/04* (2013.01); *C10G 33/08* (2013.01); *E21B 43/40* (2013.01); *B01J 2219/0801* (2013.01); *B01J 2219/0809* (2013.01); *B01J 2219/0869* (2013.01); *B01J 2219/0877* (2013.01); *C10G 2300/1025* (2013.01); *C10G 2300/805* (2013.01)

(58) Field of Classification Search
USPC ........................................................ 166/267
See application file for complete search history.

(56) References Cited

U.S. PATENT DOCUMENTS

| | | | |
|---|---|---|---|
| 2019/0112534 A1* | 4/2019 | Novoselov | F23Q 13/00 |
| 2020/0230523 A1* | 7/2020 | Oliveira Filho | C09K 8/584 |
| 2020/0299592 A1* | 9/2020 | Minhas | C10G 53/02 |

OTHER PUBLICATIONS

Honorato et al., "1H low- and high-field NMR study of the effects of plasma treatment on the oil and water fractions in crude heavy oil," Fuel, vol. 92, pp. 62-68, Feb. 2012.

Hueso et al., "Water plasmas for the revalorisation of heavy oils and cokes from petroleum refining," Environmental Science & Technology, vol. 43, pp. 2557-2562, 2009.

International Search Report and Written Opinion for PCT/US2023/022985 dated Sep. 20, 2023.

Slavens, Stephen Manson, "Microplasma Ball Reactor for Liquid Hydrocarbon Conversion," Thesis for a Master of Science, Texas A&M University, May 2014.

* cited by examiner

COSS&DW: Crude Oil Synthesized Surfactant and Demulsification Water

METHOD FOR CREATING CRUDE OIL SYNTHESIZED FLUID HAVING SURFACTANT AND DEMULSIFICATION PROPERTIES

REFERENCE TO RELATED APPLICATIONS

The present application is a divisional of U.S. patent application Ser. No. 18/320,872 filed May 19, 2023, which claims priority to U.S. Provisional Patent Application No. 63/344,374 filed May 20, 2022, each of which is incorporated herein by reference.

FIELD

The present technology generally relates to systems and methods for synthesizing surfactant and demulsification fluids.

BACKGROUND

Oil may be emulsified with impurities, such as water, dirt, or salt. Such impurities may complicate an extraction or cleanup of oil, thus demulsifiers and other chemical additives may be used. Presently available commercial demulsifiers, surfactants, etc., are sometimes beneficial for oil extraction or cleanup. These commercially available demulsifiers, surfactants, etc., are generally used in oil operations to separate oil from sands, rocky surfaces, etc. Typically, a "guess and check" method is employed to determine a suitable chemical additive to remove an disaggregate an oil-containing emulsion (e.g., from an underground reservoir, from an affected environment, etc.), which may be suboptimal, expensive, harmful to the environment, etc. Further improvements are required to advance state of the art.

SUMMARY

In a first aspect, various embodiments of the present disclosure relate to a method. The method can include receiving a non-combusting gas into a chamber. The method can include receiving a first solution comprising oil into the chamber. The method can include generating a plasma by energizing a first electrode, such that a voltage between the first electrode and a second electrode exceeds a dielectric breakdown voltage to cause dielectric breakdown between the first electrode and the second electrode. The dielectric breakdown voltage may be a dielectric breakdown voltage of the headspace gas disposed between the first and second electrodes. The method can include de-energizing the first electrode to a voltage less than the dielectric breakdown voltage. The method can include removing chemical demulsifiers from the chamber.

In a second aspect, various embodiments of the present disclosure relate to an apparatus. The apparatus can include a reaction chamber. The apparatus can include a first electrode disposed within the reaction chamber, the first electrode disposed in the reaction chamber so as to interface with a headspace gas in the reaction chamber. The apparatus can include a second electrode disposed within the reaction chamber so as to interface with a solution comprising oil in the reaction chamber. The apparatus can include a first port configured to receive the solution. The apparatus can include a second port configured to remove water from the reaction chamber, the water comprising chemical products formed in the reaction chamber. The second portion can include a controller comprising one or more processors coupled with memory. The instructions can cause the one or more processors to adjust a flow rate of the solution into the reaction chamber via the first port. The instructions can cause the one or more processors to energize the first electrode to generate a non-thermal plasma in the reaction chamber.

In a third aspect, various embodiments of the present disclosure relate to a system. The system can include a first pump configured to transport a solution including oil from an oil reservoir to a plasma electro-coalescence reactor. The system can include the plasma electro-coalescence reactor. The reactor can be configured to receive the solution. The reactor can be configured to generate non-thermal plasma along an interface between a non-combusting headspace gas and the solution. The reactor can be configured to remove oil separated from the solution. The reactor can be configured to remove water separated from the solution. The water can include demulsifiers formed along the interface of the non-combusting headspace gas and the solution. The system can include a second pump configured to transport the water from the plasma electro-coalescence reactor to the oil reservoir.

In other aspects, various embodiments relate to systems devices for performing any of the methods disclosed herein, and to methods that may be performed by the systems and devices disclosed herein.

DETAILED DESCRIPTION

Figure 1:
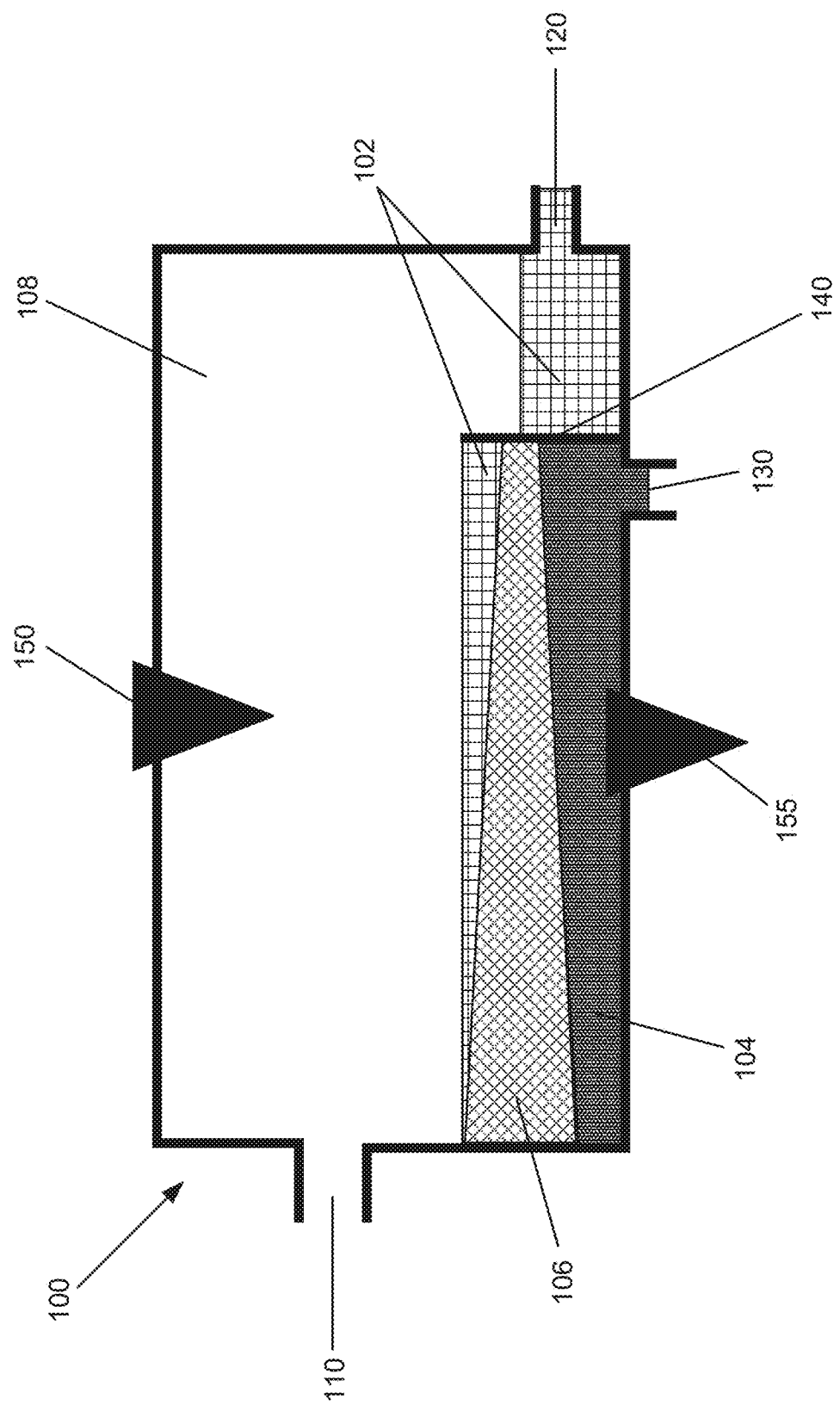
FIG. 1 is a cutaway view of an example operating plasma electro-coalescence reactor, according to various potential embodiments.

It may be possible to test various chemical additives prior to their use in an oil separating or removing operation. For example, an oil sample may be removed, an analysis of its properties may be performed, and a suitable chemical may be selected according to those properties. Unfortunately, such an approach may require extensive testing, as well as a pre-populated database of effectivity and properties of various chemical additives with various oils. Alternatively, an oil sample may be removed, and may be tested with a plurality of chemical additives. While requiring less onerous preparation, such a method may nonetheless require a great deal of analysis, and delay a start of operations, which may be undesirable (e.g., to an environment effected by an oil spill, the financial position of an oil operator, etc.). Such an analysis may consider the relative ease or difficulty with which a given chemical additive may be placed into solution or otherwise distributed throughout a given oil composition, but may be limited to a finite number of such solutions. Further, the properties of oil may vary within a reservoir (e.g., based on depth, material, weight, etc.).

One embodiment of the present disclosure manufactures a chemical additive from an oil source, which may ensure that the chemical additive is chemically suited for dispersion throughout the oil stock of that reservoir. Further, when performed as a continuous method, the chemical composition of the chemical additive may be refined based on the iterative changes to the oil composition. For example, if a given reservoir contains increasing (or decreasing) acidity, saltiness, particulates, etc., as the reservoir is depleted, an iterative or continuous method may optimize the chemical additive over time. An appropriately sized batch process may yield similar beneficial results.

Chemical products may be formed by exposing oil and its related or constituent components to plasma, which may interact with various chemicals in order to form various demulsifiers, surfactants, anti-microbial agents, etc. For example, a solution of oil, water, and particulate matter can occupy a chamber. The water may be in solution with the oil, and/or added to an emulsification (e.g., to increase volume, flow rate, etc.). For example, the water may be used in conjunction with water-flooding for enhanced oil recovery (EOR), or may be present in a marine oil spill. The chamber may also contain a headspace which is filled with a non-combusting headspace gas such as a noble gas. In some embodiments, the non-combusting mixture may be conventional natural gas, shale gas, biogas, etc., and may be available from an oil reservoir, thus it may be desirable to harvest this gas with oil, such as by the use of a pumping loop. In some embodiments, the non-combusting gas may be nitrogen gas, water vapor, or carbon-dioxide or a mixture thereof and may be available as separated from the air or combustion products. The non-combusting gas may include natural gas, or other gasses which may be combustible in combination with oxygen where the non-combustible gas does not contain oxygen. For example, the non-combustible gas can include natural gas. The pressure of the headspace gas may be used to control a fluid level in the chamber. In some embodiments, instead of or in conjunction with controlling a fluid level via control of the headspace pressure, a valve, a pump, or water injection may be used to control the fluid level.

Electrodes disposed within the chamber may then be energized, which may encourage the separation of constituent portions of the emulsified mixture. For example, an oil layer may be formed along an upper surface of the fluid of the chamber, a water layer may be formed along the bottom surface of the chamber, and a rag layer may be disposed therebetween. It is noted that the separated portions may not necessarily separate perfectly, such that the "oil" portion may comprise a small amount (e.g., less than ten percent, less than five percent, less than 2 percent, less than 1 percent, less than 0.5 percent, or less than 0.1 percent) of water and sediment, and the "water" portion may comprise a small amount (e.g., less than ten percent, less than five percent, less than 2 percent, less than 1 percent, less than 0.5 percent, or less than 0.1 percent) of oil or other components. Further, additional layers may be formed such as a sediment layer disposed below the water layer. Although such separation may be encouraged by the energized electrodes, other mechanisms such as heating or decantation may be employed.

A plurality of electrodes in the chamber can be energized beyond the dielectric breakdown between the electrodes (which may be dominated by the breakdown of the headspace gas). For example, one electrode may be placed within the headspace of the chamber, and another electrode may be placed along a bottom surface of the chamber, so that the electrodes may be energized to a voltage exceeding the dielectric breakdown thereof, causing a plasma wave front to pass through the headspace, and to at least an upper fluid surface. As the wave-front transits the headspace, it may interact with the gas therein, causing chemical adaptions of the headspace gas. An electrode may refer to, for example, a conductive (e.g., metal) electrode disposed within a fluid (e.g., the headspace or a liquid solution), or the combination of the liquid solution and the metal electrode, such as where the liquid solution is conductive such that the liquid solution and metal electrode are at a similar voltage, and it may thus be convenient to refer to the liquid solution and metal electrode in combination.

Various positive and negative ions and photons may be created, as well as other products including larger compounds (e.g., atomic hydrogen, methyl or ethyl radicals, hydroxyl radicals, etc.). Further, as the plasma wave-front traverses the liquid-gas interface, the high energy plasma and products (e.g., radicals and ultra-violet photons) may kill various microbes (e.g., oil degrading bacteria) which may be disposed along or near a surface of the oil and other constituent portions of the fluid. The products formed in the headspace, as well as along the liquid surface may further react within the liquid, including various oil and water molecules. The bombardment of the reactive species may, in combination with the various species formed within the liquid (e.g., aqueous active species, radicals and ions), render the emulsified mixture uninhabitable for at least some microbes. Such an antimicrobial effect may be profound, and may remain within the liquid for relatively long periods of time (e.g., days or weeks). Thus, the constituent parts of the emulsified fluid may be reused for their antimicrobial role long after exiting the chamber of the vessel. For example, the plasma activated water may be removed from the chamber and injected into a wellhead (e.g., for water flooding) and may thusly act to inactivate microbes within an oil reservoir, in addition to delivering various surfactants, demulsifiers, etc.

In some embodiments, a direct current (DC) may be applied to a headspace. The current may be applied at a voltage exceeding the dielectric breakdown such that plasma is formed within the chamber. For example, the plasma may be a thermal or non-thermal plasma (e.g., according to a current limited DC signal). Such an embodiment may maintain a relatively constant current which may, advantageously, aid the separation of the constituent portions of an emulsified mixture. For example, oil and water, oils and sediments, etc. may coalesce in the presence of an electric field by the operation of the electric charge on their various inter and intra-molecular charges. Other embodiments may apply an AC source, such as a sinusoidal AC source between the electrodes. Such an embodiment may result in further coalescence due to the Lorentz and ponder-motive forces applied to the various oils, salts and other sediments, water, etc. The voltages and currents may be selected based on the construction of the chamber, the desired rate of separation, temperature, etc. In some embodiments, a current may be selected for its heating effect which may, advantageously, speed coalescence. Alternatively or in addition, another element may heat the liquid, or the process may not rely on a heating process.

Some embodiments may employ millisecond pulsing, nanosecond pulsing, or other short duration pulses. Such embodiments may generate highly reactive non-equilibrium ionization (which may be referred to as cold plasma, non-thermal plasma, or the like) which may, increase the temperature of a portion of the headspace gas (e.g., electron temperature) without raising the net temperature of the headspace. Such a plasma may be more energy efficient, and allow for a broader selection of chamber construction materials or techniques than for an equilibrium plasma. The interaction of the charged particles of the plasma may result in a variety of active species in the gas phase, or aqueous active species in the liquid phase. Some species may be formed due to the primary interaction with the plasma and the gas, along the gas-liquid interface, or within the liquid (e.g., along the interface of the electrode). Some species may be formed due to secondary and tertiary reactions between various primary products.

Nanosecond pulsing is pulsing in the range of any number of nanoseconds, (i.e., about 1-999 nanoseconds). Some embodiments have a pulse duration of about 3-15 nanoseconds. Millisecond pulsing refers to any number of milliseconds, and the present disclosure also contemplates microsecond pulsing or other patterns of pulsed output. In many embodiments, the pulses may have relatively fast rise and fall times, such as sub-nanosecond. Some embodiments may have a slower rise or fall time, such as a sinusoidal signal. Further, many embodiments have a relatively low duty cycle, such as an order of magnitude greater inactive time than pulse time, which may energize the electrons of a headspace gas without raising an overall temperature of the headspace to temperatures that may be unmanageable, or difficult to manage. Some embodiments, such as a sinusoidal system may have a higher duty cycle. The inactive time may return the relative potential between the electrodes to a ground state, or another value may be selected. For example, an AC or DC voltage greater than zero but less than the dielectric breakdown voltage may be applied to the electrodes. Such a design may continue to impart coalescing effects via the applied electric field when plasma is not being actively generated, and may minimize the current spikes needed to reach dielectric breakdown.

The disclosed method may be performed as a continuous flow process, which may increase production speed or improve process control. The various electrode voltages, gap distances, ports, etc. may be sized according to a desired flow rate of a given oil, or a flow rate may be varied to achieve a targeted result (e.g., rag layer thickness, surfactant density, water purity, etc.).

FIG. 1 depicts one embodiment of a plasma electro-coalescence reactor 100 which may be used to generate the various demulsifiers, surfactants, etc. disclosed herein. The reactor contains a first port 110, which may be used as an input to receive a mixture (e.g., oil, water, and non-combusting gas mixture). A headspace of the electro-coalescence reactor 100 includes a gas-phase portion of the contents of the electro-coalescence reactor 100. For example, the headspace can intermediate any reactor fluid disposed in the electro-coalescence reactor 100 and an upper surface of an inner portion of the electro-coalescence reactor 100 such that an increase of a level of reactor fluid may cause a corresponding decrease in a headspace volume. The first port 110 can be disposed at a level of a headspace of the reactor (e.g., to avoid backflow), or below the headspace (e.g., to avoid headspace depressurization). In some embodiments, additional ports may be provided for the emulsified liquid and the non-combusting gas mixture. Beneficially, this may simplify the recirculation of the gas, such as by a regulated valve which may be used alone or in conjunction with a pump.

A first electrode 150 is disposed opposite a second electrode 155. In some embodiments, the first electrode 150 may be energized to a high voltage, the second electrode 155 may be energized to a lower voltage (e.g., ground) and the geometry (e.g., a point facing the second electrode 155) of the first electrode 150 may encourage plasma discharge (e.g., a generation of ions from the electric field, or the acceleration of the ions along the electric field). Some embodiments may reverse the polarity of the electrodes, or use another voltage for the second electrode which may, beneficially, detect conduction between the second electrode 155 and a ground reference which may be undesirable, for example, due to grounding concerns. For example, a ground fault detection circuit can intermediate one or more electrodes and one or more grounds. The second electrode 155 may include points facing the first electrode 150 in some embodiments. Points can include any features protruding in a direction towards a corresponding electrode, which may reduce an inter-electrode distance relative to other portions of the electrodes. Some embodiments may make use of multiple first electrodes 150, or a first electrode 150 containing multiple points 150. The second electrode 155, or its points, may also be duplicated in some reactor designs. In some embodiments, the second electrode 155 may be a conductive meshed sheet, or include other openings to allow a passage of reactor fluid there-through. Points may include rough or sharp surfaces (e.g., may be non-spherical) which may increase a generation of plasma.

The use of an electrode design such as a meshed sheet may allow the mixture and/or its component parts ("reactor fluid") to permeate the sheet, while allowing the plasma to reach the second electrode 155 along conductive paths within the reactor fluid. In some embodiments, the distance between the first electrode 150 and the second electrode 155 may be adjustable, such as based on the composition and level of the reactor fluid or upon an electrode height adjustment. For example, a mechanical adjustment such as a screw, motor, or other mechanism can adjust an electrode location. In some embodiments, the controller can engage the mechanism to adjust the height of the electrode. For example, the controller can adjust the lower electrode 155 responsive to a rag layer 106 position, such that the electrode-reactor fluid interface can include a water layer 104, rag layer 106, or oil layer 102. The gap between the various electrodes, and the gap the between various electrodes and a gas-liquid interface may be selected to generate primary or secondary reactions. The use of multiple electrodes, or an electrode such as a mesh sheet may allow for relatively consistent gap distance between electrodes, or between an electrode and a liquid surface.

The addition of stronger electrostatic and electrodynamic forces due to the application of an electric field, Lorentz forces, electrohydrodynamic forces, and ponder-motive forces due to gradients in the electric field and changes in the dielectric constants of the mediums may accelerate the motion of oil or water droplets within the reactor fluid. Furthermore, the application of electric charges to the droplets (e.g., oil and water) may hasten their polarization and coalescence. A larger electric field, and more charges deposited into the droplets may result in an increase in the rate of separation and coalescence. The sediments may fall out of solution (e.g., due to gravity, polar forces, etc.) and collect, for example, at the bottom of the reactor 100. The sediments may experience charging, electric field and associated forces hastening separation. The reactor 100 may comprise a panel to remove accumulated sediment. In some embodiments, the reactor may contain a weir 140 or similar liquid depth and flow rate control mechanism. The weir 140 may be configured to allow the oil layer 102 to flow over the weir 140 by, for example, adjusting the height of the weir 140, which may be performed by the controller by actuating a mechanical adjustment via a motor. The controller can further adjust the flow rate of the reactor fluid, or the release of the oil layer 102, such as through a second port 120, controlled by a valve which may be mechanically or electrically controlled, for example, based on the level of the reactor fluid, or the water content of the reactor fluid at one or more locations within the reactor. A third port 130 can be configured to remove demulsifiers or other chemical products along with water, or sediments from the reactor 100.

The fluid level may be adjusted, for example, by the weir 140, to adjust the gap distance (e.g., between the liquid surface and the first electrode 150) which may increase a rate or efficiency of formation of plasma. The profile of the weir 140 can be used to elicit a specific flow rate versus fluid depth relationship dependent on fluid properties and composition, which may cause a change in composition of quantity of emulsifiers, surfactants, and the like.

The gas headspace 108 of the reactor may contain a non-oxidative or non-combustible gas. The non-oxidative gas may comprise one or more constituent gases, such as $CO_2$ and methane. It is noted that the headspace 108 may comprise some quantity of combustible and oxidative gas, such as $O_2$, the amount of which may depend, for example, on the construction of the reactor and the pressure of the gas. For example, one embodiment of the reactor may tolerate 2% $O_2$ in the reactor headspace 108 during operation. In various embodiments, the relevant criteria limiting the $O_2$ concentration is the flammability ignition limit for the mixture. For example, a higher concentration of $O_2$ may be present in a $CO_2/O_2$ mixture than in a methane/$O_2$ mixture, according to some embodiments. When the electrodes are energized, a breakdown of the dielectric properties of the gas may occur, resulting in plasma being emitted from, for example, the first electrode 150 and in the direction of, for example, the second electrode 155. The energetic particles of the plasma in the headspace 108 may interact with each other, or with the fluid, (e.g., particularly along an upper surface of the fluid, but to some extent throughout). The energetic particles of the plasma in the headspace 108 may interact with each other, or with the fluid, (e.g., particularly along an upper surface of the fluid, but to some extent throughout). The resulting chemical interaction in combination with the electric field may result in water or oil droplets in the reactor fluid forming or coalescing into larger droplets, the larger oil droplets rising out of the emulsified mixture and the larger oil droplets falling out of solution. The chemical interaction in combination with the electric field may cause the inactivation of various microbes.

Although the primary and secondary interactions may alter the chemical structure of various molecules of the emulsified mixture, other portions may remain unmodified. For example, a large hydrocarbon chain may undergo chain scission, leaving much of the molecule unchanged. Thus, aside from the scission site, the molecule may exhibit similar properties as the unaffected molecule. At scale, and combined with various other affected molecules, this may result in various molecules that have demulsification, surfactant properties, etc., but which are otherwise suited to the solution or emulsion of otherwise unaffected molecules. Thus, the resulting solution/emulsion may be more amendable to separation than an emulsion which has been treated with an optimized commercially available chemical additive, without the various delays, costs, environmental impacts, etc. that such an additive may have. Put another way, the formed chemicals are not only lipophilic, they are oil-philic, and may be specifically suited to their native oil (e.g., having a particular set of sulfites, metals, salts, etc.) of a given reservoir at a given time.

Figure 2:
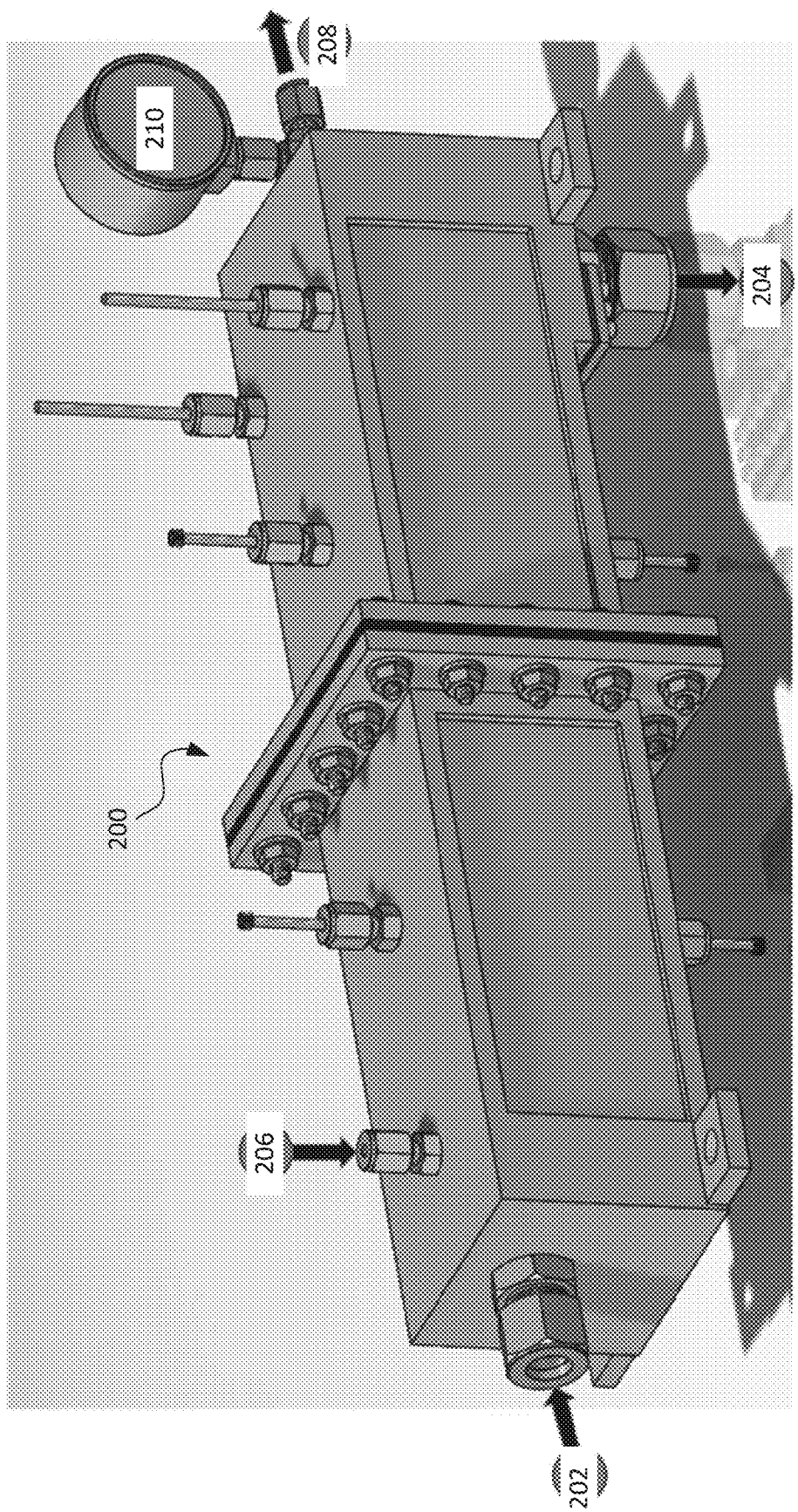
FIG. 2 is an example of a plasma electro-coalescence reactor, according to various potential embodiments.

FIG. 2 discloses an example of a plasma electro-coalescence reactor 200, according to various potential embodiments. The reactor 200 contains a first port 202 to allow an emulsified mixture to enter the reactor 200, as well as a second port 204 to allow separated oil, water, or solids to exit the reactor 200. The emulsified mixture can have a range of densities according to a water or sediment content thereof. For example, a density of an emulsified mixture may be about 965 kg/m^3, 954 kg/m^3, 947 kg/m^3, or 937 kg/m^3 depending on its specific content. A dewatered oil or emulsified mixture can have a density of about 920 kg/m^3, or the like. It is noted that an emulsified mixture can vary according to a location, well water content, extraction method, and so forth. For example, Saudi or Permian Basin oil may so vary.

In some embodiments, the reactor 200 includes various second ports 204 such as a second ports 204 to expel water from the reactor and a second ports 204 to expel oil from the reactor 200, separate from the port to expel water. In some embodiments, a sediment port can expel sediments from the reactor. For example, the sediment port can include or interface with a sediment collection area, filter, cover plate, valve, or the like which is removably attached to the reactor such that the port can be selectively removed, opened, or otherwise actuated (e.g., by or via a controller) to remove sediments from the reactor 200. In some embodiments, a single-phase separation output can alternate between expelling water and oil. In some embodiments, a controller can actuate one or more ports responsive to a detected condition of the reactor or the contents thereof. For example, the controller may open, close, or otherwise actuate the first port 202 to adjust a flow rate of an emulsified material into the reactor 200 responsive to a level of material in the reactor or a pressure of the headspace 108 of the reactor, to regulate a concentration of chemical products which accumulate in the water. The controller may open, close, or otherwise actuate the second port 204 to adjust a flow rate of one or more materials from the reactor (e.g., water, oil, a rag layer 106, solids, etc.) responsive to a level of material in the reactor, a pressure of the headspace 108 of the reactor, or the like. For example, the level of the material can be a proportion or quantity (e.g., mass, volume, etc.) of solids, a rag layer 106, oil, or water to adjust a concentration of chemical products which accumulate in the water.

The reactor 200 may contain a gas input 206, which allows a non-oxidative gas to enter the reactor 200. For example, a wellhead or other source can feed the non-oxidative gas into the reactor 200. The gas input 206 can include or interface with an element to separate the non-oxidative gas from oxidizers (e.g., atmospheric oxygen). For example, the gas input can include or interface with a flame or reactant prior to entering the chamber, or adjust a flow rate (e.g., close) in response to a detected oxygen level in excess of a threshold (e.g., a combustion threshold). The gas input 206 or gas outlet port 208, can include a pressure regulator 210 which may maintain the gas headspace 108 in adjusting a flow rate of the gas into or out of the reactor 200 at a given pressure. In various embodiments, reactor pressure may be at or near ambient pressure. In various embodiments, pressure could be any suitable pressure, such as 15 psi above ambient, a well production pressure, or a pressure near the delivery pressure to the raw gas uptake pipelines. The controller may determine the pressure, for example, based on the emulsified mixture, the reactor fluid level, the available gas, or the surfactant level within the reactor fluid. In some embodiments, the controller may use the gas pressure to control the flow of the emulsified mixture into the reactor (e.g., into the first port). For example, a pressure regulator 210 disposed over the gas outlet port may increase a pressure of the headspace 108 of the reactor to decrease a flow rate into the reactor 200 or decrease a pressure of the headspace 108 to increase a flow rate into the reactor 200.

In some embodiments, the non-oxidative gas is entrained with the liquid flow and/or dissolved within the liquid at down-hole pressures (i.e., in the reservoir itself) and coming out of solution as a separate phase in a lower-pressure reactor, such as for reservoirs including oil and natural gas. For example, the third port and the first port can be a same port of the reactor 200, or the first port can provide gas in addition to the gas received by the third port. Some embodiments may return all or a portion of the gas which exits the gas outlet port to the gas inlet port. This additional gas may enhance oil recovery by accelerating the separation of components of the emulsified mixture. For example, the increased quantity of gas can increase an overall reaction rate and maintenance of gas including products may promote the formation of secondary or tertiary products. The plasma discharge within the gas phase can promote chemical reactions between the gas phase molecules and liquid phase molecules such as by bombarding the surface of the reactor fluid with high energy ions. These reactive species may combine with large species forming new species in processes of cross linking and addition and can also convert into smaller liquid fuel molecules such as gasoline or diesel during treatment through a process of cracking, substitution, radical termination, etc. The encounter of a radical (such a methyl radical) with a stable molecule can initiate such as breaking of a C—C bond and cracking to smaller molecules. Similarly, a C—H bond can be broken, leading to a cross-linking reaction or a disproportionation reaction. All these various pathways exist with relative selectivity based upon the radical, pressure, and temperatures (gas temperature, electron temperature, and vibrational temperature). Non-equilibrium reactions are favored by high electron and vibrational temperature and low gas and neutral species temperature. Some non-equilibrium reactions can favor gas to liquid conversion and cracking reactions.

The reactor may include a circuit which pulses voltage between at least two electrodes in order to repeatedly create plasma discharges in the headspace 108 thereof. For example, an embodiment may be configured to provide pulses in the nanosecond range, at a frequency in the kilohertz range. An example of pulsing voltages for generation of non-equilibrium discharge is provided henceforth at FIG. 7 of the present disclosure.

Figure 3:
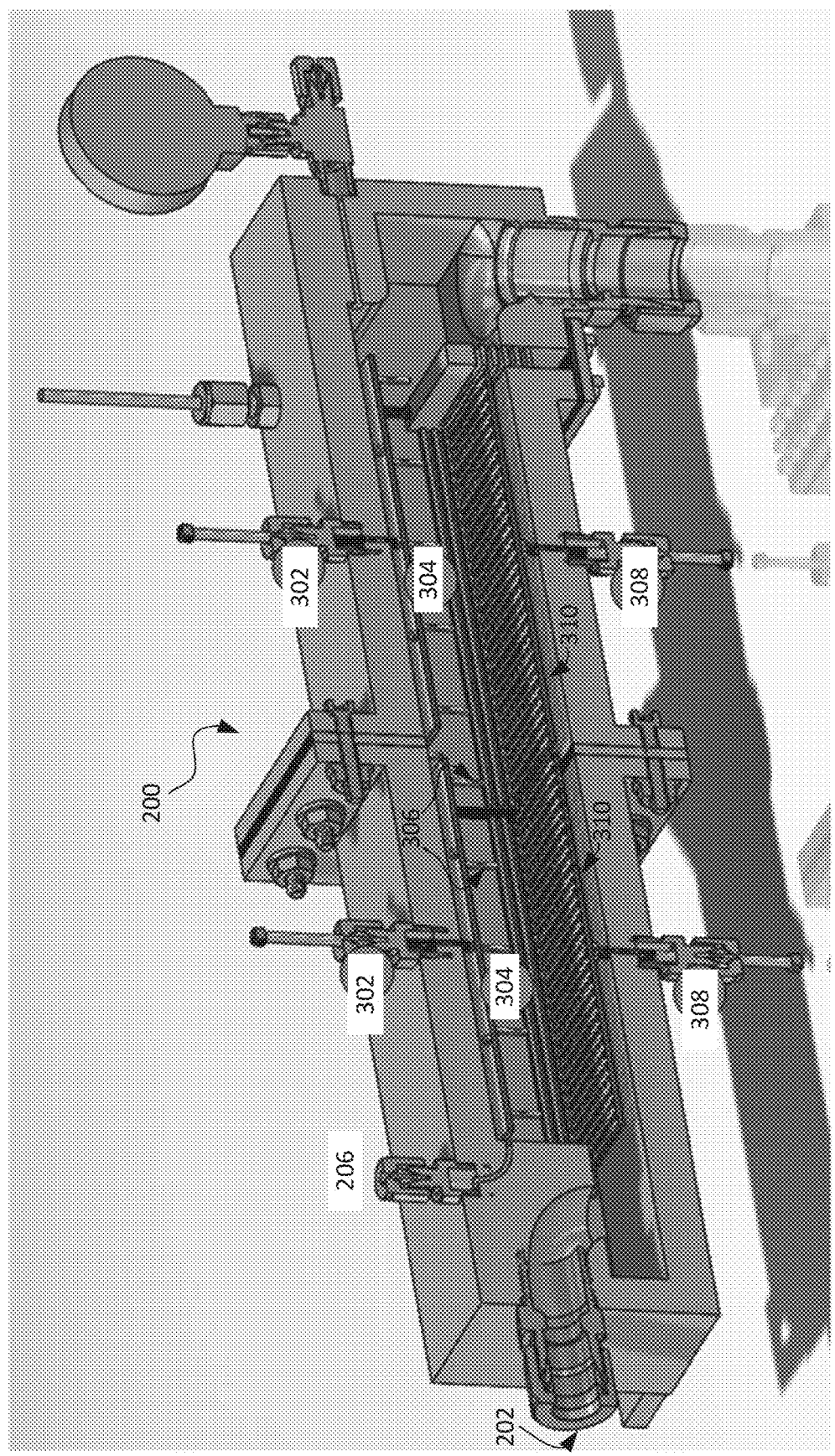
FIG. 3 is a cutaway drawing of an example plasma electro-coalescence reactor, according to various potential embodiments.

FIG. 3, a cutaway drawing of an example plasma electro-coalescence reactor 200, displays first electrodes 302 which may be energized to a voltage that causes a dielectric breakdown of the headspace gas, for example, the voltage can range from 10 kV to 40 kV, such as 25 kV. It is noted that the voltage may be varied based on the geometry of the reactor (e.g., the distance between the electrodes, such that higher voltages are employed with higher distances), the composition of the reactor fluid and the gas (e.g., different gases and pressures may have different breakdown voltages), the flow rate (e.g., a higher flow rate may warrant more plasma discharge), etc. The first electrodes 302 comprise their inputs, shown passing through the body of the reactor 200, as well as sheets 304 constructed of a conductive material (e.g., brass, silver, nickel, and/or aluminum which may be selected based on their resistance to corrosion when interfacing with oils, salts, plasmas, etc.). The sheets include points 306 extending toward second electrodes 308 which may be connected to a reference ground. The first electrodes 302 may be configured to interface with the non-oxidizing gas in a headspace 108 of the reactor 200. Such an electrode may cause a plasma discharge in the headspace 108. In various embodiments, another electrode is disposed within the reactor fluid, such that a plasma discharge may interface along the gas-liquid boundary, bombarding the liquid with plasma (such as ionized hydrogen derived from the gas-phase). For example, the first electrodes 302 can include one or more points configured to generate plasma in hydrogen-comprising gasses such as methane, dihydrogen ($H_2$), or the like. The first electrodes 302 may be electrically connected or isolated from other electrode pairs, and may be connected to one or more voltage sources. In some embodiments, additional or fewer first electrodes 302 may be employed in a reactor 200.

The second electrodes 308 comprise their input which can receive a connection from a terminal connector of an energy source, shown passing through the body of the reactor 200, and a mesh or slotted sheets 310, which are composed of a conductive material (e.g., brass, silver, nickel, and/or aluminum which may be selected based on their resistance to corrosion when interfacing with oils, salts, plasmas, etc.). The second electrode 108 may be configured to interface with a reactor fluid such as oil, water, a rag layer 106, sediments, or the like. For example, the second electrode may be disposed beneath a headspace 108 of the reactor 200. As discussed above, such a configuration can cause the plasma to interact with the liquid-gas interface. The metals may be chosen because they have low temperature plasma catalytic properties. Slots or other openings of the sheets 310 may allow reactor fluid to pass through the sheets 310, which may permit a separation of components of the emulsified mixture through the electrode. In some embodiments, the sheets may be formed in order to better separate the fluid (e.g., as "V" channels). The second electrodes 308 may be electrically connected or isolated, and may be connected to one or more voltage sources. In various embodiments, the reactor includes additional or fewer second electrodes 308.

The material(s) of the first electrodes 302 and second electrodes 308 may be the same or may differ from each other. For example, if portions of the second electrodes 308 are designed for submersion and portions of the first electrodes 302 are not, a different material may be selected to interface (e.g., avoid corrosion) with their respective environments. In some embodiments, the distance between the second electrodes 308, and the voltage of the electrodes may be constant. In other embodiments, the distance may not be constant. For example, in some embodiments, the electrodes (or portions of an electrode) may be closer to each other towards a second port of the reactor, based, for example, on a narrower rag layer 106 at that point. Alternatively, or in addition, the bottom or top of the reactor may be sloped, "V" shaped, etc. In some embodiments, the separation between the electrodes, or a portion thereof, may be adjustable. For example, the controller may instruct an actuator to move one or more electrodes to adjust separations therebetween.

Figure 4:
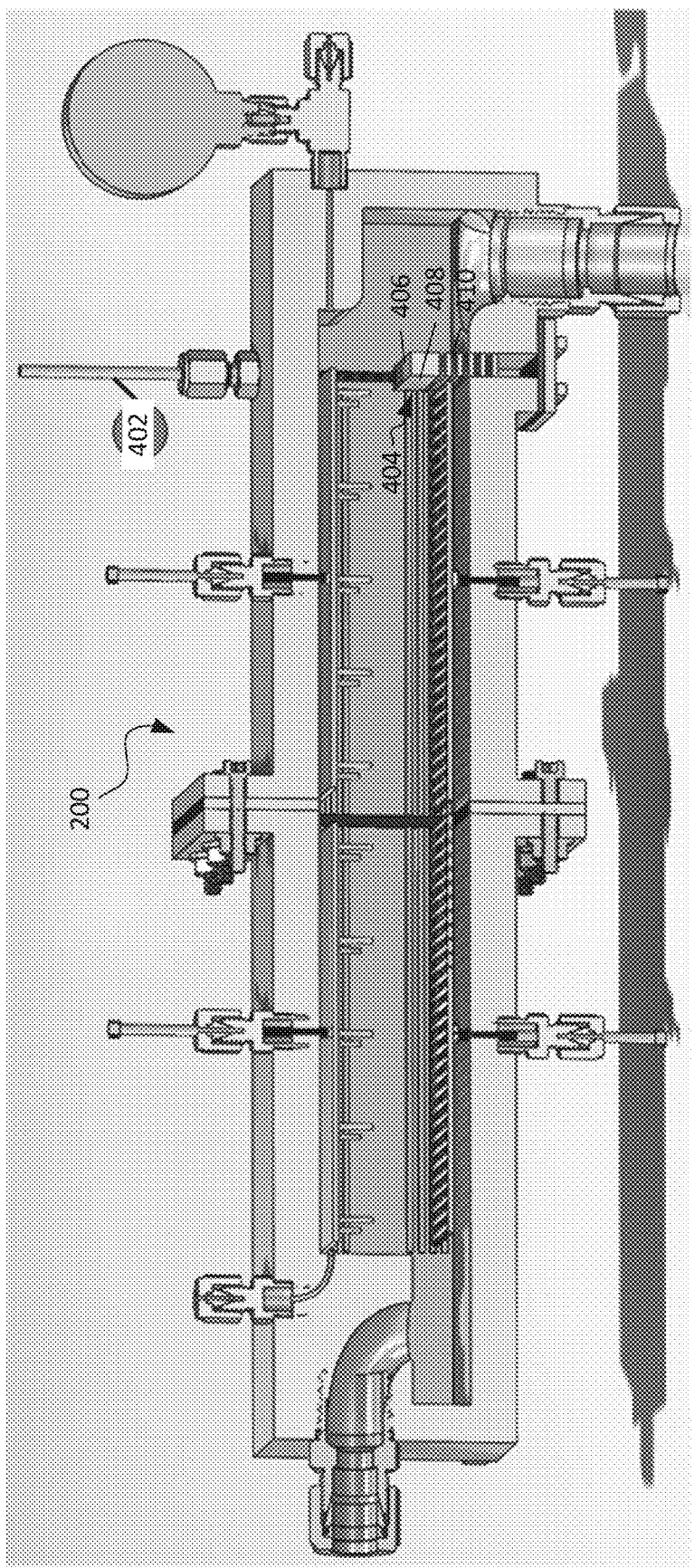
FIG. 4 discloses another cutaway drawing of an example plasma electro-coalescence reactor, according to various potential embodiments.

FIG. 4 discloses another cutaway drawing of an example plasma electro-coalescence reactor. The reactor contains a weir adjustment rod 402 which a controller may use to adjust the height of the weir 404. For example, a controller may adjust the weir 404 higher or lower to block the rag layer 106 from exiting the reactor, or in order to control the flow rate. The weir position may also be used to control the liquid-gas interface height relative to the electrodes and other reactor components. For example, lowering a weir may increase a distance between a surface of the emulsified mixture and the first electrode, which may increase a breakdown voltage thereof. In some embodiments, the weir 404 may be non-adjustable, such that oil, water, and the like can be expelled according to a flow rate thereof. The adjustment rod is not intended to limit the adjustability of the weir. Various adjustment mechanisms can be employed, according to various embodiments.

The weir 404 can include an upper surface 406. In various embodiments, the height of the weir may be adjustable to permit oil disposed along an upper surface of the reactor fluid to pass over the weir 404 and exit the reactor. The weir 404 can include a blocking surface 408 to interface with (e.g., to block) a rag layer 106 from transiting the weir 404. The size or location of the blocking surface 408 can be configured or adjusted (e.g., via the controller) based on a composition of reactor fluid (e.g., or a thickness or position of the weir 404). For example, the controller may adjust the blocking surface to allow the egress of separated oil or water while maintaining rag layer 106 separation. The weir 404 can include one or more openings 410 for water, sediment, or the like to bypass the weir 404. Such separation of constituent components of the emulsified mixture can be termed as mechanical separation thereof. Water or sediment can pass through the openings 410 to a same port as, or a different port from, the oil for processing, removal, recycling, or the like.

Figure 5:
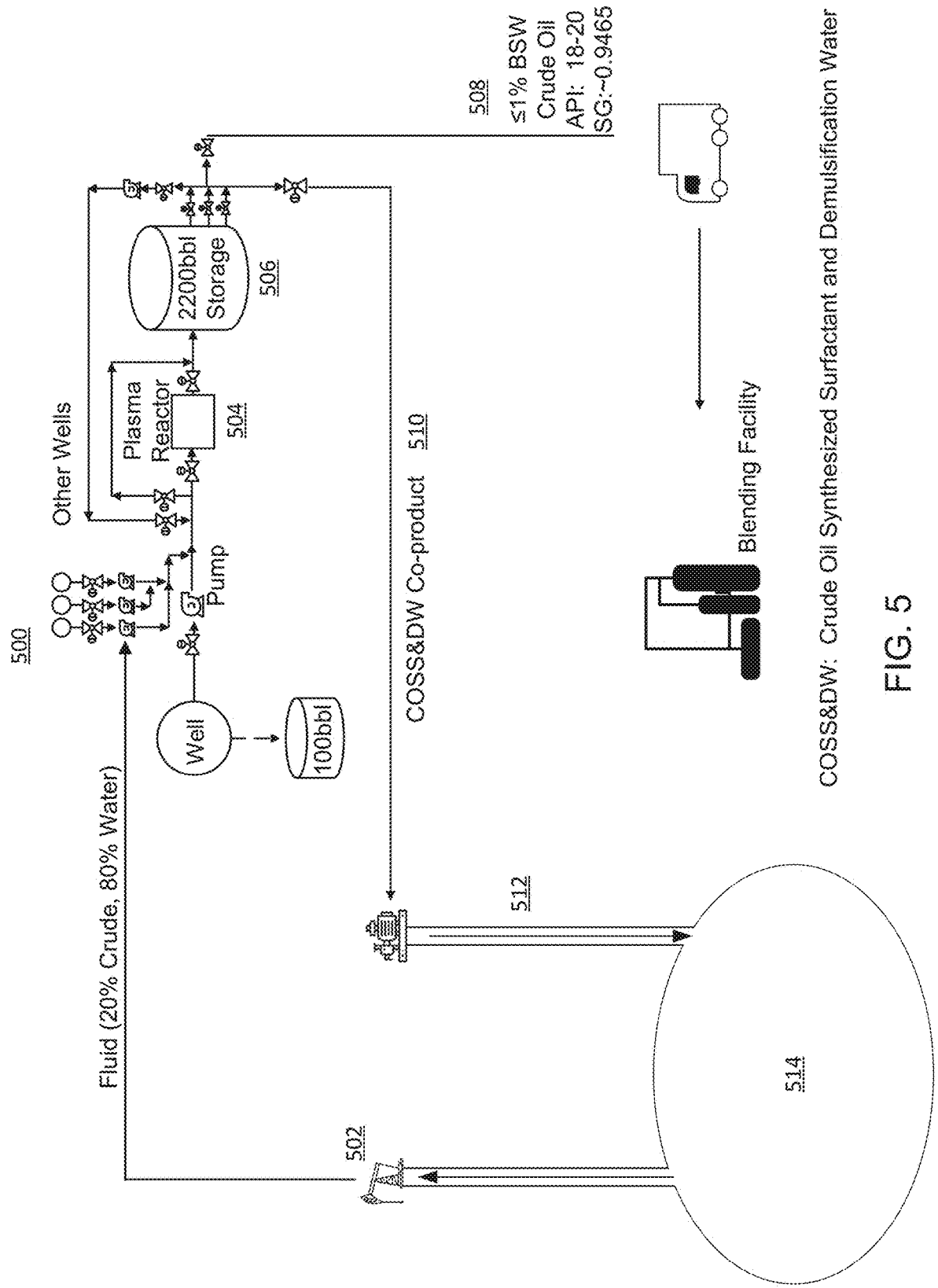
FIG. 5 depicts a method employing the plasma electro-coalescence reactor, according to various potential embodiments.

FIG. 5 discloses a method 500 of recovering oil from a subterranean/underground source. In other embodiments, oil may be recovered from another source such as sand on a beach following an oil spill. In some embodiments an oil water mixture may be recovered from an oil seep, plume, film, tarballs or mat, on a body of water following an oil spill. An emulsified mixture is removed from the ground at operation 502. The emulsified mixture may be naturally occurring, or resulting from the infusion of water into a store of oil "water flooded." For example, a reactor or other device can determine a specific gravity, viscosity, or other indicia of a water content of an emulsified mixture and, responsive to the determination, provide a quantity of water to adjust a relative percentage, pressure, or other condition of a reservoir. The water can include distilled or treated water, such as water removed by the reactor of FIGS. 1-4. The operation can produce oil, water, gas, and heterogeneous emulsified mixtures of these components at various relative weight percentages. The emulsified mixture can be conveyed to one or more holding tanks (e.g., settling tanks) intermediate to the oil reservoir and the reactor. Some reservoirs can include bypass valves to bypass a holding tank which is intermediate to the reservoir and the reactor.

Operation 504 may comprise processing the emulsified mixture by a reactor, for example, any of the reactors disclosed by FIGS. 1-4 can be employed, resulting in demulsifiers and surfactants which may be contained in the oil, the water, or the gas and which can include or be termed as "chemical products." Where used herein, the chemical products can include chemical demulsifiers, chemical surfactants, and other products. For example, low boiling point products like butane and propanol may be present in both the gas and liquid phases. Plasma synthesized precursors for liquid phase products may also be present in the gas phase, such that recycling the gas may promote the formation of additional liquid phase products. The emulsified mixture or products derived therefrom can undergo production tests such as tests for specific gravity, components, viscosity, or the like. Any of the operations of the oil recovery at operation 502 or the processing at operation 504 can be adjusted based on the testing. For example, testing can be performed during the processing in situ in a reactor, or thereafter. For example, a separation of an emulsified mixture in the minutes, hours, or days following expulsion from the reactor can be tested. The emulsified mixture or products derived therefrom can be combined, such as to expose oil derived from further wells with chemical products such as chemical demulsifiers of the operation 504.

The water and chemical product mixture ("plasma enhanced water") may add significant functional and monetary value to the water relative to untreated produced water. This plasma enhanced water may contain chemicals which can facilitate separation of oil from water, or oil from sand or reservoir rock in enhanced oil recovery operations. Such chemicals may, in some embodiments, be synthesized from the existing water and oil without the addition of external chemicals, based on the supplied electrical energy. In some embodiments, the plasma enhanced water and process does not employ additional chemical additives and obviates or reduces the need for externally supplied chemicals. In another embodiment, chemical additives may be used in combination with the plasma process, and may synergistically enhance the phase separation process and further enhance the functionality and value of the plasma enhanced water. At operation 504, a controller of the reactor can adjust a flow rate or recirculation proportion of plasma enhanced water based on a desired or measured concentration. The desired or measured concentration may be based on the properties of oil received from the oil reservoir.

The electrical energy can be received from power transmission lines or produced onsite near the reactor through the use various sources for example: solar, wind, thermal, fossil or bio-fuel generator. In some embodiments, produced gases and gases liberated by the plasma reactor may be used in an engine to provide electrical power to the plasma reactor.

In some embodiments, the processing reactor is located at the surface adjacent to a production well head. In some embodiments the processing reactor is located at a collection and storage facility where oil from multiple productions wells may be gathered. In yet another embodiment the processing reactor is placed within the well or downhole. In various embodiments, the operations of FIG. 5 can be performed at or across various positions, such that a temperature, composition, or other property can vary therebetween. A production test site, well, reactor, or storage facility can vary in distance and a composition (e.g., emulsification, temperature, or gravity) may vary between the locations according to an environment thereof or a mixing or separation of the emulsified mixture. For example, an emulsified mixture can have an American Petroleum Institute (API) gravity of about 16 and a temperature of less than 100° C. (e.g., about 15° C., about 43° C., or the like). This process could work on an API oil or emulsion. Typically separation processes are harder on low (API 5 to API 30) oil mixtures and oils. The controller of the reactor can adjust a concentration of chemical products in the plasma enhanced water based on a comparison, to a threshold, of a property of the oil at one or more operations of the method at one or more locations.

A constituent part of the reactor fluid (e.g., the oil, gas, chemical products, purified water, etc.) may be stored, at operation 506, for eventual sale or transportation, at operation 508. A lower grade oil may have an API weight of between about 5 and about 20 during storage or transportation. A higher grade oil may have an API weight of 20 to 50. The oil may have a basic sediment and water (BSS) content of less than 5%. For example, a BSS can be less than 1%. The oil may have a specific gravity of about 0.85 to 1.1. Another constituent part of the reactor fluid (e.g., wastewater, plasma enhanced water, chemical products, etc.) may, at operation 510, be stored or returned to an oil field, which may include injecting the fluid into an underground/subterranean well. The storage tank may be a settling tank whereby the properties of oil in the settling tank may vary over time. At operation 512, the water (or other chemical product) reenters a well, via injection by pumping, gravity, etc., until reaching the oil reservoir. At operation 514, the chemical product (e.g., resulting from the operation of water pressure, temperature, chemical impact of surfactants, etc.) may free additional oil from, for example, reservoir rock which may then be returned, as an emulsified mixture (e.g., by the controller via pumping) at operation 502, into a production well and to the surface. For example, a wettability of the water can be adjusted (e.g., to a contact angle of about 15°, in view of a similar contact angle of 45° for distilled water under similar conditions). By repeated cycling of the plasma enhanced water, larger amounts of chemical product may enter the reservoir, and increase the useful life of a well, which may result in an increased proportion of oil produced from the formation/reservoir, further enhancement of the water and additional chemical product. Alternatively, or in addition, a portion of the chemical product could be removed (e.g., to enable their sale or comply with environmental requirements).

In some disclosed embodiments, the emulsified mixture can be 80% water, and 20% crude. The mixture fraction can vary depending on the use and power of the waterflood or other enhanced oil recovery methods (e.g., the injected flowrate, rock permeability, etc.). The fraction can vary significantly based on an age of the production site; typically, newer sites have a higher crude fraction and older sites have higher water fraction. Some embodiments may operate with any percent mixture. Some embodiments may make use of different mixtures. For example, late in the life-cycle of an oil well, increased proportions of water may increase the life of an oil well. Additionally, oil spill remediation efforts may process mixtures approaching 100% water, in latter stages of certain cleanup efforts. In some embodiments, the emulsified mixture can include treated or untreated water injected subsequent to a removal from a reservoir at operation 502.

Figure 6:
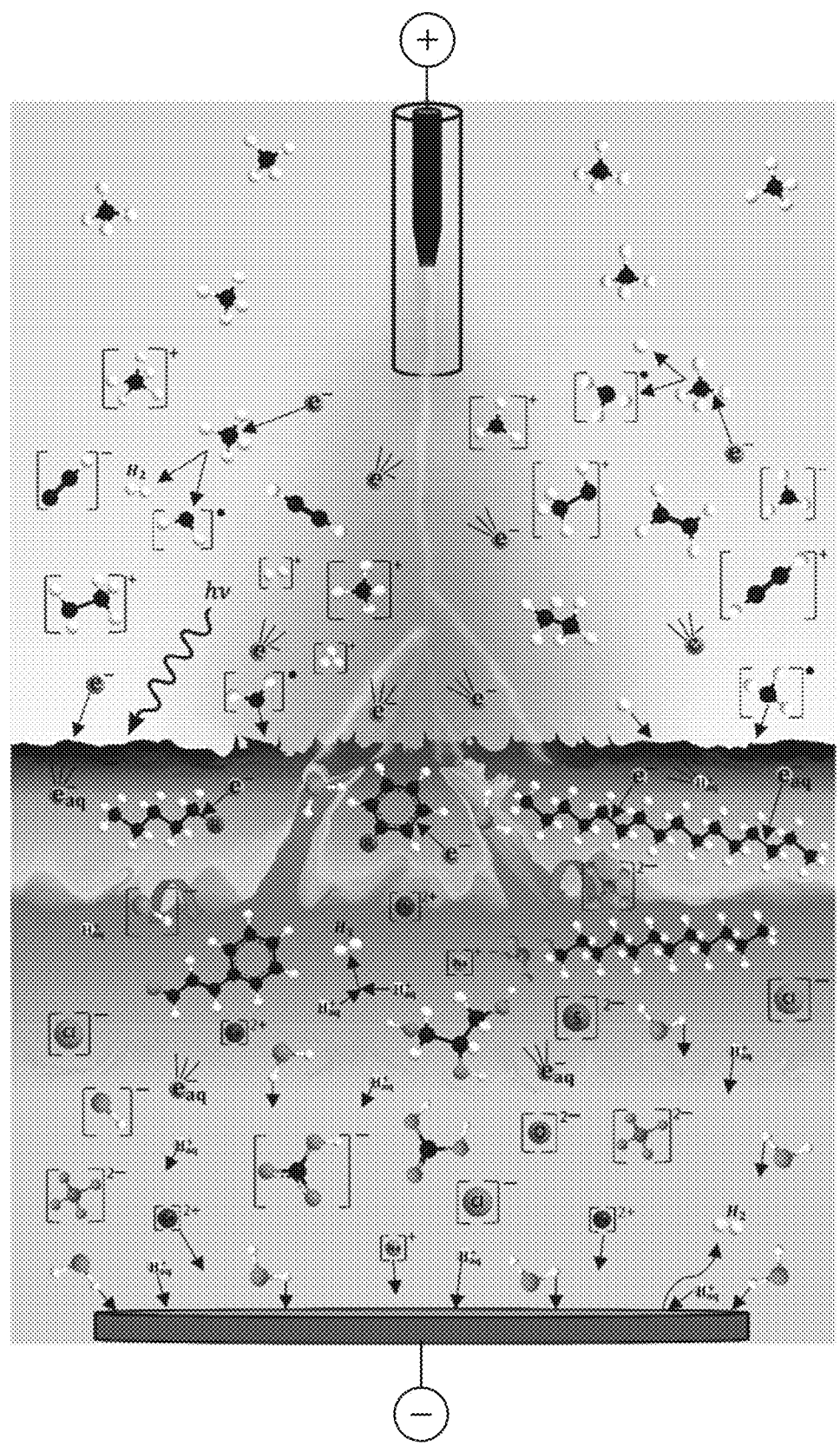
FIG. 6 depicts plasma-chemical processes occurring in a plasma electro-coalescence reactor, according to various potential embodiments.

FIG. 6 illustrates various chemical and physical processes which can occur in the multiphase plasma discharge process, according to various potential embodiments. An electric discharge is generated in a gas above a liquid surface (e.g., by a controller instructing a power supply). The liquid may comprise oil and water. A first electrode (or a plurality of electrodes) is in the gas phase, a second (or multiple) electrodes are in the liquid phase. A high voltage (e.g., 1 kV to 50 kV or 10 kV to 40 kV, or 20 kV to 30 kV) differential is applied between the electrodes to generate a non-thermal, non-equilibrium plasma discharge in the gas space above the liquid. The plasma discharge may be transiently pulsing, nanosecond pulsing, a low current DC discharge, etc. This configuration may also apply a significant electric field and a small current to the multiphase liquid. Charged bodies within the liquid (e.g., solid particles, oil, or water droplets) are electro-hydraulically, electrophoretically, or through entrainment, convected through the liquid due to the applied electric forces. The high electric field, and the resulting plasma generation, may lead to primary plasma-chemical reactions in the gas phase (e.g., by the stripping of hydrogen from methane or other molecules and the recombination thereof), primary plasma-chemical reactions at the gas-liquid interface, and secondary plasma-chemical reactions within the liquids. Electrochemical reactions may be initiated at the second electrode based on the application of voltage thereto, which may be similar or different (e.g., less pronounced) than at the first electrode.

In the plasma phase, free electrons can initiate low temperature plasma-chemical reactions; these may include the formation of atomic hydrogen, the formation of methyl radicals, and the formation of hydroxyl radicals as well as various other vibrationally and electronically excited species, negative and positive ions, and energetic photons. These reactive species interface with the liquid surface reacting with water and oil molecules. These reactive species may transport into the liquid becoming aqueous active species, radicals and ions. In the liquid phase these species may further transform into other radical and reactive neutral species, charged species, and complexes. Many potential reaction chemistries can occur in these configurations. The complex water, oil, and gas mixtures allows for a huge variety of accessible potential compounds. The low temperature non-thermal non-equilibrium plasma provides the activation energy (directly or indirectly) to facilitate the formation of various non-ionic surfactants, anionic surfactants, switterion surfactants, lippophillic groups, amophoteric surfactants, cationic surfactants, or previously undiscovered or unnamed surfactants. Synthesized from heterogeneous media, the chemical structure and synthesized compounds can be very heterogeneous, containing hydrophilic and hydrophobic groups. Various polyols and other synthetic polymers can also be synthesized which may act as demulsifiers.

In one example, a plasma generated OH molecule or radical reacts with a complex hydrocarbon molecule ($C_xH_y$) in the oil phase, reacting to form an unsaturated and oxidized hydrocarbon molecule similar in structure to a non-ionic surfactant like trans-cinnamaldehyde. In another example, the produced water contains salt ions such as sodium and sulfate ions, reactive species from the plasma reaction with the oil causing chain scission of the oil molecule, the long chain radical product reacts with sulfate ions in the water solution to produce a molecule similar to sodium laureth sulphate.

In various embodiments, the materials flowing through the reactor receive an energy input from the plasma discharge process. The energy input may be quantified as a specific energy input (SEI) of kilo-joules per kilo-gram of material. This specific energy input is a product of the plasma discharge voltage, discharge current, and residence time of a unit mass within the reactor. On average the SEI may be locally non-uniform with the gas and upper liquid surface receiving a higher SEI than the bulk liquid. On average the power required to operate the system will depend on the SEI (or plasma dose) required to affect the desired change and the throughput of the reactor. SEI of 10 KJ/kg have been shown to change the properties of the water and cause deemulsification. Depending on the throughput, surfactant synthesis type or quantity, and impact on the oil and water, average SEI from significantly less than 10 KJ/kg to as high as 200 KJ/kg may be employed. Different SEI may correspond to different chemical products for a rector with a given volume, geometry, gas-liquid interface surface area, voltage, and so forth. For example, an SEI in the range of 10 KJ/kg to 200 KJ/kg may be selected, according to some embodiments. Another SEI may be selected, such as 0.1 KJ/kg to 1 KJ/kg, 1 KJ/kg to 10 KJ/kg, or in excess of 200 KJ/kg, according to some embodiments.

These plasma synthesized surfactant and demulsification molecules may be in solution (e.g., may approach being in perfect solution) and may be highly miscible. The uniqueness of having a surfactant and demulsification water solution synthesized from the crude oil itself will serve as a tailored or otherwise "custom made" surfactant to use for that crude oil and reservoir, as compared to engineered surfactants that may have lower effectiveness and/or efficiency by virtue of, for example, changes in the crude oil that enters the reactor over time and estimations (and potentially guess work) that are involved. This plasma enhanced water not only is an optimized or customized surfactant for any specific crude oil and reservoir when synthesized from the crude oil itself, but it also is a two-in-one water solution, with demulsification molecules to reduce foaming, enhance separation, and enhance crude oil and water separation during production, leading to a reduction in retention time (i.e., time needed in the reactor). Commerically added surfactant and water solutions during the separation and injection process may be poorly formulated for the specific produced oil and water and thus be highly immiscible, leading to poor recoveries and higher volumes of chemicals used.

The water that leaves the processing reactor may exhibit improved properties with respect to enhanced oil recovery (and similar operations) compared to produced water from the well or other water entering the reactor. The plasma enhanced water may also be better at removing oil from bound surfaces in various applications (such as reservoirs rock in EOR, or sand and wildlife in oil spill cleanup). The plasma that hits the surface of the crude oil and water mixture depositing energy and charge to synthesize and activate surfactant and demulsification molecules to provide efficient oil mobility during subterranean enhanced oil recovery waterflooding operations.

Figure 7:
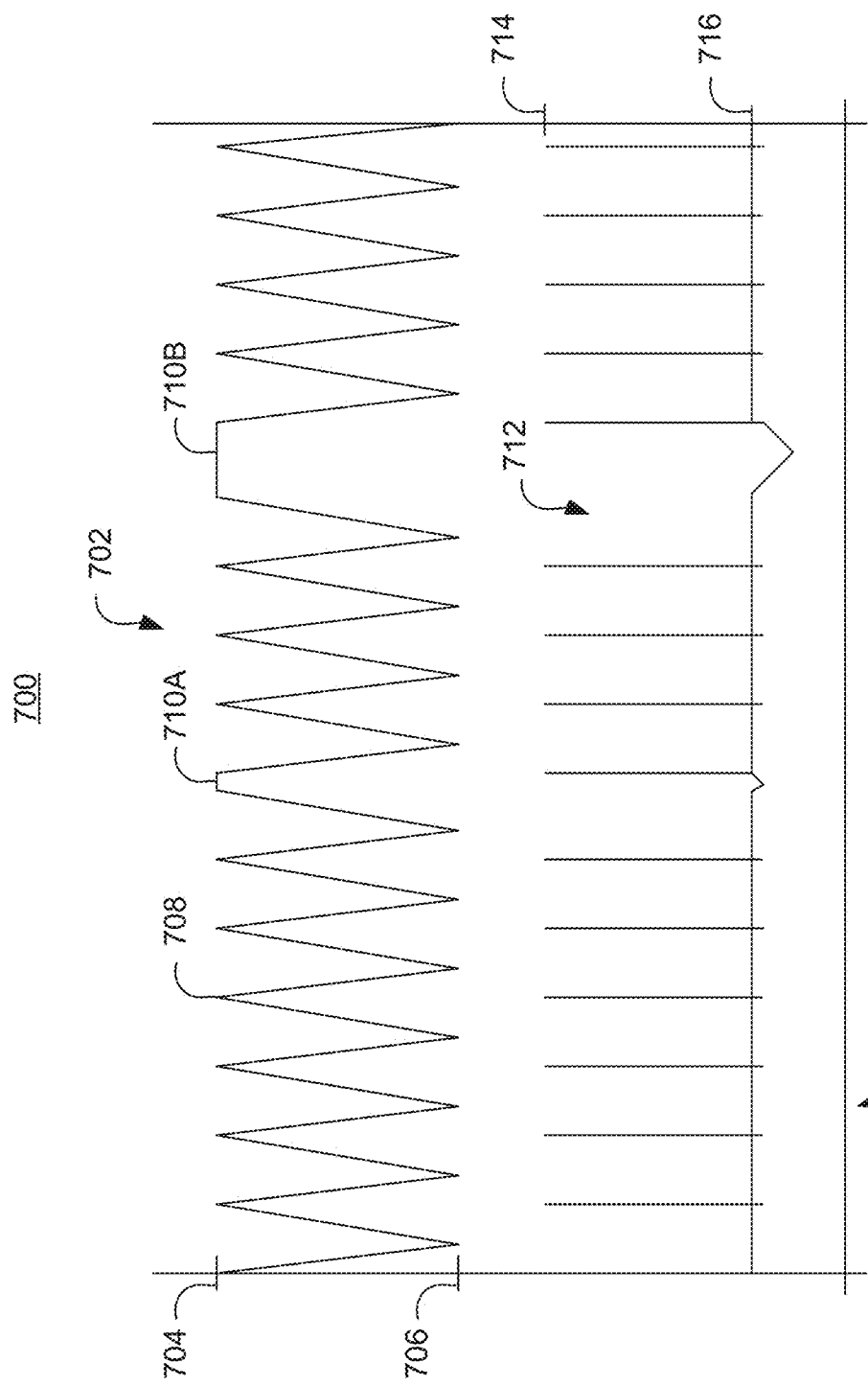
FIG. 7 depicts a voltage-current relationship for electrodes of a plasma electro-coalescence reactor, according to various potential embodiments.

FIG. 7 depicts a voltage-current relationship 700 supplied by an energy source to electrodes of a reactor over a time axis 718. For example, the reactor can include the reactor 200 of FIG. 2. A voltage curve 702 depicts a voltage between electrodes, which may vary between a local maximum value 704 (e.g., about 25 kV) and a local minimum value 706 (e.g., about 15 kV). Such a voltage can vary according to electrode or reactor geometry, headspace pressure, composition of an emulsified mixture and the like. Various voltage curves 702 may correspond to various aqueous active species, or other reactive species. The voltage curve may be varied over time to adjust a quantity of active species produces, or a type of active species. For example, a first portion of the voltage curve 702 may be selected to generate various primary reactions, and thereafter, a second portion of the voltage curve 702 may be selected to generate various secondary or tertiary reactions. A current curve 712 can correspond to the voltage curve 702, and may also be adjusted (e.g., an adjustment of a current limit) to generate a type or quantity of active species. For example, one or more local maximums 708 of the voltage can correspond to a breakdown of a non-oxidizing gas disposed between respective electrodes of a reactor. Such a breakdown can result in a plasma pulse corresponding with an increase in current supplied between a leakage current 716 and an emission current 714. Responsive to the increase in current (e.g., upon a detection thereof or a depletion of energy stored at a capacitor of the energy source), the energy source can lower a voltage to a local minimum. An energy storage device (e.g., capacitor) may recharge until a further dielectric breakdown.

In some embodiments, the energy source can supply a predefined voltage waveform configured to provide plasma emissions. In some embodiments, a voltage waveform may be adjusted based on a quantity or type of reactions caused in the chamber. For example, responsive to a settling time in a tank exceeding a threshold, the voltage waveform may be increased in magnitude or frequency to increase a quantity of chemical products formed. In some embodiments, a breakdown may be detected by the energy source. For example, at a first period of a sustained local maximum 710A, a maximum voltage is maintained until an increase in current output, indicative of a plasma discharge, is detected. Likewise, at a second period of a sustained local maximum 710B, the maximum voltage is maintained until an increase in current output is detected.

The frequency of the voltage signal can be adjusted, for example, to a value such as 1 Hz, 10 Hz, 100 Hz, 1 kHz, or the like. A range of 50 Hz to 200 Hz may be appropriate for power density and reactor compactness in various embodiments. The discharge may contribute energy to the reactor fluid. For example, a specific energy input of less than 20 KJ/kg, less than 10 KJ/kg, or less than 1 KJ/kg. Put differently, the energy employed to achieve separation may not impart significant energy to the reactor (resulting in less heating), such that the reactor may operate at or near an ambient temperature (e.g., less than 100C, less than 50C, or less than 30C). In some embodiments, any of the pulse duration, period, rise time, fall time, etc. may be adjustable. For example, a parameter such as operating frequency may be adjusted based on an electrode gap, an oil viscosity, a temperature, etc. For example, various embodiments processing various emulsions may energize an electrode in the range of 1-10 ns, 20-30 ns, 30-50 ns, or 50-100 ns. A total cycle time may be selected having any duty cycle. For example, an energized duration of 10 ns would have a duty cycle of 1% at a frequency of 1 Mhz, 0.1% at 100 kHz, 0.01% at 10 khz, and 0.001% at 1 khz. Although varying by several orders of magnitude, the various pulsing signals use less power than would be associated with a generation of a "hot" or "thermal" plasma.

Figure 8:
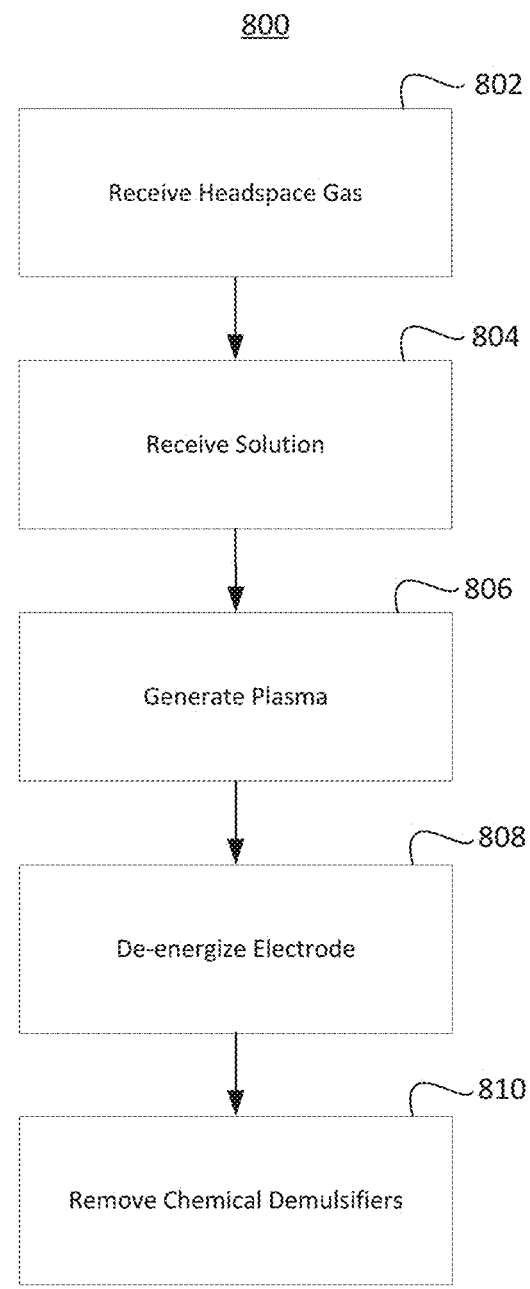
FIG. 8 discloses another method employing a plasma electro-coalescence reactor to disaggregate components of an emulsified mixture, according to various potential embodiments.

FIG. 8 discloses a method for the demulsification of oil-including emulsions or other mixtures. In brief summary, at operation 802, a non-combusting gas is received into a chamber. At operation 804, an oil-containing solution is received into the chamber. At operation 806, plasma is generated by energizing an electrode. At operation 808, the electrode is de-energized. Chemical demulsifiers are removed from the chamber at operation 810. The method 800 may be a continuous or batch process.

In further detail, at operation 802, a chamber of a reactor is filled with a non-combusting gas. The non-combusting gas may be a non-combusting gas. The gas can be received in a headspace 108 of the chamber above a material such as a solution including an emulsified mixture contained therein (e.g., subsequent to operation 804), may occupy the whole chamber (e.g., prior to operation 802), or may be received continuously (e.g., responsive to a pressure or flow rate of the chamber which may be concurrent with operation 804).

The non-combusting gas can displace an oxidative gas such as oxygen (e.g., via a gas outlet port, seam, gasket leakage, or the like). In some embodiments, the non-combusting gas can be maintained at a pressure in excess of atmospheric pressure, such that the positive pressure prevents an ingress of other gas. In some embodiments, a pressure regulator disposed on a gas output port or gas input port of the chamber may adjust a flow rate of gas into or out of the chamber to maintain a pressure at no less than a lower threshold and no higher than an upper threshold. In some embodiments, the lower threshold or the upper threshold may be adjusted to adjust a flow rate of the solution such as to maximize throughput according to a separation thereof. For example, a flow rate of 5 liters per minute, 50 liters per minute, or 500 liters per minute can be selected and the number of electrodes and size of chamber scaled such that the specific energy input is appropriate (as discussed above). The quantity or composition of gas in the chamber can be selected to selectively generate desired products or reactants (e.g., chemical products).

In further detail, at operation 804, a solution is received into a first port of the chamber. The solution can be received at a same or different port as the gas. For example, the solution can include entrained non-combustible gas. The solution can include oil, water, salts, sediments, and the like. Water from the solution can include water which is generated by processes in the chamber. For example, the water can circulate between the chamber and a source of the solution such as a storage facility, pipeline, oil reservoir, or the like. Such water can include various chemical products. The solution can be received continuously during the method 800, such as for a continuous process, or as a discrete operation such as for a batch process. In some embodiments, the solution can include water, or water can be added to the solution in situ (e.g., waterflooding may be employed).

In further detail, at operation 806, a first electrode is energized with respect to a second electrode, which may also be referred to as energizing a pair of electrodes, to a voltage in excess of a breakdown voltage of the non-combusting gas to generate a non-thermal plasma. A first electrode can refer to an electrode disposed in the headspace 108 of the chamber. A second electrode can refer to an electrode disposed below the solution received at operation 804, or a constituent portion thereof such that a gas-liquid interface (e.g., gas-emulsion interface) intermediates the first and second electrodes. The breakdown of the headspace gas can be a branched complete breakdown (also called a streamer or a streamer-corona or a corona-glow transition) wherein the surface of the liquid is generally perpendicular to the breakdown direction. The surface of the liquid can have a same, substantially similar, or substantially different voltage as the second electrode according to a conductivity of the solution.

Each of the first or second electrodes can include one or more connections to a voltage source or other power supply. Each of the first or second electrodes can include points or a surface which is parallel to a solution or other liquid of the chamber. In some embodiments, each point can be a separate electrode. For example, the first electrode can include one or more points (e.g., spikes, tubes, bulges, or other protrusions) which extend towards the second electrode. Upon an application of voltage between the first and second electrodes, the points can generate plasma which is accelerated towards the second electrode (e.g., towards the gas-liquid interface). In some embodiments, a chamber can employ multiple first or second electrodes. Such electrodes can be energized at a same or different voltage, or at a same or different time (e.g., in-phase or out of phase). The chamber can include or interface with one or more voltage sources. The voltage sources can energize an electrode pair to a voltage exceeding the breakdown voltage of the non-combusting gas. For example, the voltage source can provide a pre-determined voltage based on an expected breakdown voltage of the non-combusting gas, or increase voltage until a dielectric breakdown is detected (e.g., based on changes in detected voltage) or anticipated (see, e.g., the discussion of FIG. 7) and thereafter adjust a voltage of the electrodes as needed.

In further detail, at operation 808, the first electrode is de-energized. De-energizing the second electrode can include reducing a voltage between the first and second electrode to zero, or to a non-zero voltage which is less than the breakdown voltage of the gas (e.g., to maintain electro-coalescence). Operations 806 and 808 may be repeated. For example, the voltage source can generate pulses of dielectric breakdown to cause a generation of plasma between the first electrode and the second electrode, generate an electric field between the electrodes including an intermediate surface of a liquid of the chamber. The plasma may transfer an electrical charge to a liquid (e.g., emulsion, water, or oil) of the chamber. The application of the plasma, the electric field, and the like may cause a separation of the solution, such as a separation of water and oil from the solution. Sediments or soluble components such as dirt, salt, or the like may also separate from the solution.

In further detail, at operation 810, chemical demulsifiers are removed from a port of the chamber. The chemical interactions with the plasma, and the electro-coalescence in the chamber can disaggregate the water from the solution prior to expulsion from the chamber. The chamber can expel the water from a same or different port as the oil, sediments or other components of the emulsified mixture. The water can exit via one or more openings of a weir, or a port of the chamber disposed prior to advancing over, through, or under the weir. For example, a port disposed below a rag layer 106 of a chamber can expel water, sediment, and the like. According to some embodiments, the chamber can recycle water to maintain a fluid level, or to introduce treated water to an emulsified mixture (e.g., to increase a rate of separation thereof, such as in combination with the plasma reactor). The fluid level can be adjusted according to a desired breakdown voltage. According to some embodiments, the water can be recirculated through the chamber, or introduced (e.g., pumped) into an oil or gas reservoir, storage tank, or otherwise retained or transferred for use. For example, the treated water can be introduced to a reservoir as an antiseptic agent responsive to a presence of bacteria or other organisms, or responsive to a flow rate of oil from the reservoir (e.g., may be introduced to extend a lifetime of a well responsive to a production therefrom). The flow rate of the water through the chamber can be varied to control a quantity of chemical demulsifiers in the chamber or in a fluid received from the chamber. For example, a controller can control the flow rate or implement, cause, schedule, or initiate the various operations of the method 800.

Figure 9A:
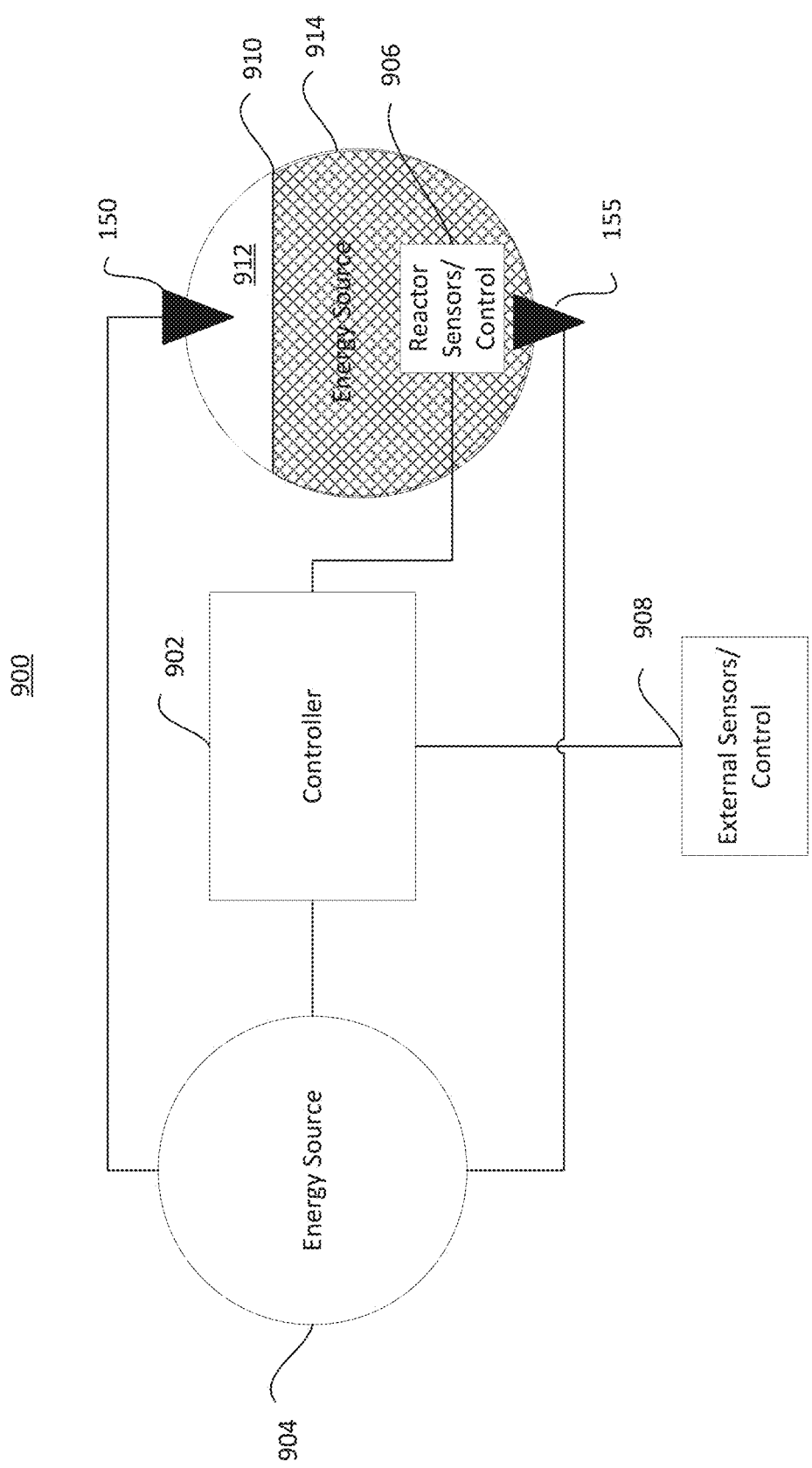
FIGS. 9A and 9B disclose a system including a plasma electro-coalescence reactor, according to various potential embodiments.

FIG. 9A discloses a system 900 including a plasma electro-coalescence reactor 200, according to various potential embodiments. The system 900 can include a controller 902 comprising various circuitry, such as one or more processors configured to perform operations discussed in the present disclosure, and a memory device (e.g., a non-volatile memory comprising instructions that, when executed by the one or more processors, cause the one or more processors to execute the various operations). The one or more processors can be configured for, and/or the instructions can include, the actuation of various valves, motors, or the like to operate the reactor 100, the receipt or processing (e.g., comparison between or to a threshold) of sensor data, the actuation of an energy source 904, or the like. For example, the controller 902 can adjust the various ports of the reactor 100 to set a level of a liquid-gas boundary 910 between a headspace 912 of the reactor 100 and any reactor fluid, sediment, or the like.

The controller 902 can interface with one or more energy sources 904. For example, the controller 902 can define a periodicity or magnitude of a voltage generated by the energy source 904. Such a periodicity or magnitude can be based on a dielectric breakdown voltage of the non-oxidative gas and the geometry of the reactor or a headspace 912 thereof. The energy source 904 may be connected to at least a first 150 and a second 155 electrode of at least one reactor. The controller 902 can interface with various sensors or controls 906 within or coupled to the reactor. The controller 902 can determine a position of the headspace based on a depth sensor such as a float sensor, a capacitive sensor, or a reflected light sensor (e.g., infrared sensor). The controller 902 can determine a flow rate via a mass flow sensor, a velocity sensor, a pressure gradient or differential, or the like (e.g., via a pressure sensor). The controller 902 can determine an oxygen content via an oxygen sensor. The controller 902 can adjust a valve, pump, weir, or the like to maintain a level of an emulsified mixture or a component thereof. Indeed, the controller 902 can interface with various sensors to determine or adjust any operation discussed herein.

The controller 902 can interface with a plurality of sensors or controls 908 exterior to the reactor. For example, the controller 902 can interface with downpipe pressure sensors, temperature sensors, downpipe pumps, distribution pumps or the like. The controller 902 can determine a waterflood amount based on a viscosity or flow rate of the downpipe emulsified mixture, prior to entry to the reactor 100. The controller 902 can interface with various sensors associated with processing of oil or water subsequent to exiting a reactor 100. For example, the controller 902 can adjust a flow rate responsive to a holding capacity of a storage tank, or a pressurization associated with a connection between a reactor port and another device. In some embodiments, the controller 902 can include one or more processors connected by a wired or wireless network to interface with one or more reactors. As depicted, the reactor can include or receive a solution such as an oil comprising emulsified mixture 914.

Figure 9B:
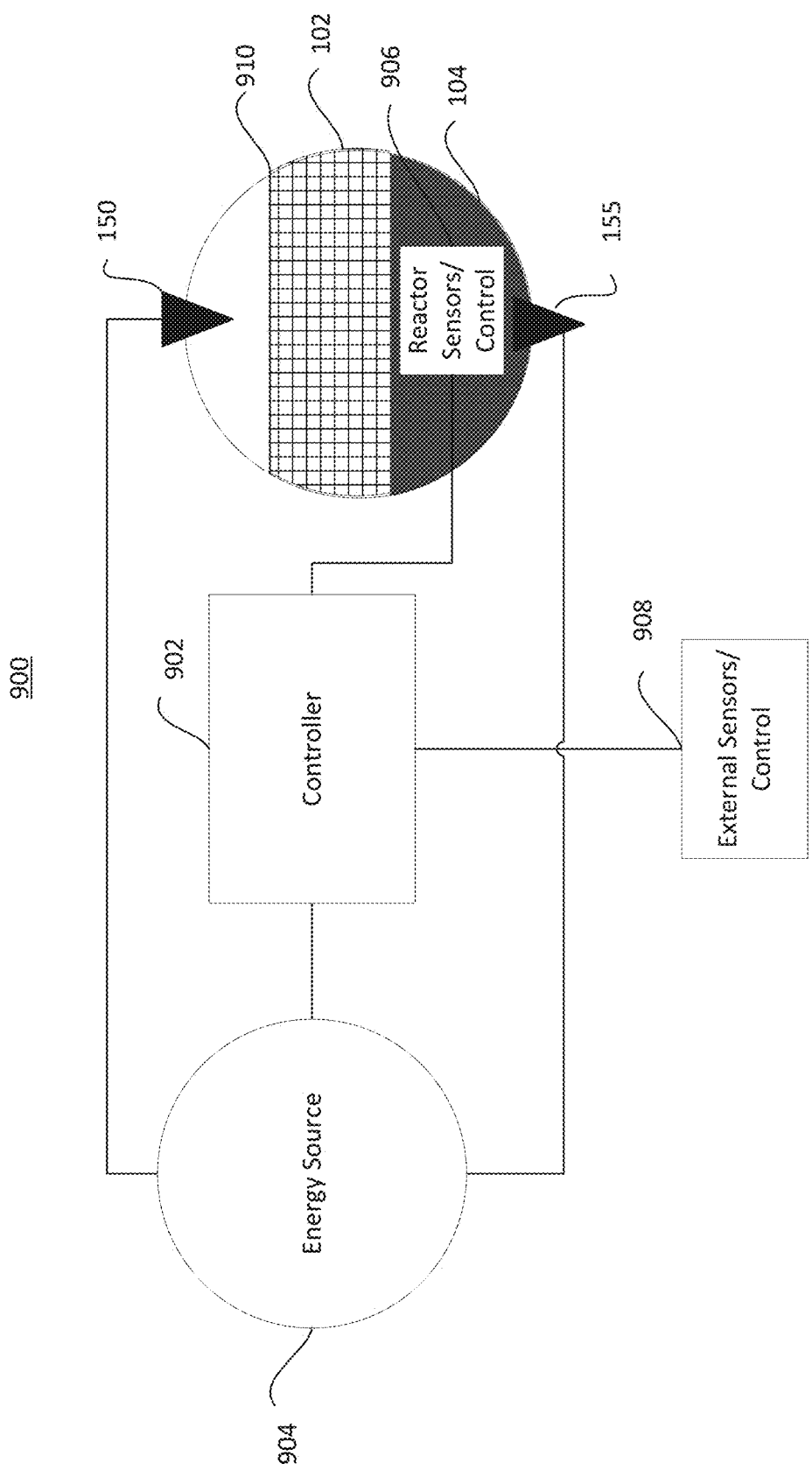

FIG. 9B discloses a system 900 including a plasma electro-coalescence reactor 200, according to various potential embodiments. For example, the system of 9B can depict a same system of FIG. 9A wherein reactor 100 has separated the emulsified mixture 914 to form an oil layer 102 and a water layer 104, as is described with further regard to FIG. 1 or throughout the present specification. In some embodiments, a portion of the emulsified mixture 914 can form a rag layer 106.

Embodiments of the apparatuses and processes thus generally described above, may be better understood by reference to the Appendix, which provides additional details on features of various potential embodiments of the inventive aspects disclosed herein, and is not intended to be limiting of the apparatuses or processes described above in any manner.

For the purposes of this disclosure and unless otherwise specified, "a" or "an" means "one or more." As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term. As used herein, "or" should be understood as inclusive. For example, A or B or C can include only A; only B; only C; only A and B; or all of A, B, and C.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The embodiments, illustratively described herein may suitably be practiced in the absence of any element or elements, limitation or limitations, not specifically disclosed herein. Thus, for example, the terms 'comprising,' 'including,' 'containing,' etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and processes within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular processes, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group, with regard to the reactor design, the chemical species thereof, etc.

As will be understood by one skilled in the art, for any and all purposes, particularly in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into sub-ranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

What is claimed is:

1. An apparatus comprising:
a reaction chamber;
a first electrode disposed within the reaction chamber so as to interface with a headspace gas in the reaction chamber;
a second electrode disposed within the reaction chamber so as to interface with a solution comprising oil in the reaction chamber;
a first port configured to receive the solution;
a second port configured to remove water from the reaction chamber, the water comprising chemical products formed in the reaction chamber; and
a controller comprising one or more processors coupled with memory, the memory including instructions that, when executed by the one or more processors, cause the one or more processors to:
adjust a flow rate of the solution into the reaction chamber via the first port; and
energize the first electrode and/or the second electrode to generate a non-thermal plasma in the reaction chamber,
wherein the appratus is configured to adjust energization of the first electrode and/or the second electrode based on a dielectric breakdown evetn.

2. The apparatus of claim 1, wherein the controller is configured to:
determine, directly or indirectly, a concentration of the chemical products in the water; and
adjust the flow rate of the solution into the reaction chamber based on the concentration of the chemical products.

3. The apparatus of claim 1, further comprising a weir disposed within the reaction chamber, wherein the controller is configured to:
adjust a position of the weir to adjust a flow rate of the water from the reaction chamber based on a concentration of the chemical products in the water.

4. The apparatus of claim 1, wherein the second port is different from the first port, and wherein the controller is configured to:
cause the water to exit the reaction chamber via the second port; and
cause at least a portion of the water to re-enter the first port while the first electrode is energized.

5. The apparatus of claim 4, wherein the controller is configured to determine a portion of the water exiting the second port to re-enter the first port based on a property of oil removed from the reaction chamber, the property comprising at least one of a basic sediment and water (BS&W) content, a specific gravity, or a density.

6. The apparatus of claim 5, wherein the property of the oil is determined at a storage tank remote from the reaction chamber following a predefined settling time for the oil.

7. The apparatus of claim 1, wherein the controller is configured to:
adjust a flow rate of the solution from an oil reservoir to a holding tank, which intermediates the oil reservoir and the reaction chamber.

8. The apparatus of claim 1, wherein:
the first electrode comprises one or more protrusions configured to generate plasma discharge directed toward the solution; and
the second electrode comprises a conductive meshed or perforated sheet configured to allow the solution to pass therethrough while maintaining electrical conductivity.

9. The apparatus of claim 1, wherein:
the controller is configured to energize the first electrode with nanosecond pulses having a duration between 1 ns and 100 ns, a repetition frequency between 1 Hz and 1 kHz, and a duty cycle, and
an inactive time between pulses is at least an order of magnitude greater than a pulse duration, thereby generating non-equilibrium ionization while maintaining the headspace gas at a temperature below that which would cause a transition to a thermal plasma state.

10. The apparatus of claim 1, wherein the controller is configured to maintain a target specific energy input (SEI) to material flowing through the reaction chamber within a range of 0.1 KJ/kg to 200 KJ/kg by coordinating adjustments of (a) electrode voltage, (b) pulse parameters, and (c) solution flow rate.

11. The apparatus of claim 1, wherein the controller is configured to dynamically adjust at least one of a pulse voltage, a pulse repetition frequency, or a duty cycle in response to a sensed separation efficiency of oil and water or a settling-time measurement determined at a downstream storage tank.

12. The apparatus of claim 1, further comprising a pressure regulator, wherein the headspace gas comprises, at least in part, natural gas received from an oil reservoir, and wherein the controller is configured to adjust the pressure of the headspace gas via the pressure regulator to control a fluid level of the solution in the reaction chamber.

13. The apparatus of claim 1, further comprising an actuator mechanically coupled to at least one of the first electrode and/or the second electrode, wherein the controller is configured to drive the actuator to adjust a gap distance between the first electrode and a surface of the solution to regulate a dielectric breakdown voltage.

14. The apparatus of claim 13, wherein the controller is configured to adjust the gap distance responsive to a detected position of a rag layer within the solution.

15. The apparatus of claim 1, wherein the controller is configured to detect the dielectric breakdown event by detecting a corresponding increase in current or voltage at the first electrode and/or the second electrode and, in response, adjust a voltae or a current applied to the first electrode and/or the second electrode.

16. The apparatus of claim 1, further comprising a pump, wherein the second port is fluidically coupled to the pump and configured to direct the water containing the chemical products to the pump for injection into an oil reservoir to enhance oil recovery by mobilizing additional oil from reservoir rock.

17. The apparatus of claim 1, wherein the chemical products comprise antimicrobial agents, and wherein the controller is configured to adjust one or more plasma-generation parameters to achieve a targeted antimicrobial effect in the solution.

18. The apparatus of claim 1, further comprising an oxygen sensor configured to monitor the headspace gas, wherein the controller is configured to de-energize or inhibit energization of the first electrode if a sensed oxygen level exceeds a preset flammability threshold.

19. The apparatus of claim 1, wherein the controller is configured to detect a ground-fault condition associated with one or more electrodes and, in response, de-energize the first electrode.

20. The apparatus of claim 1, further comprising a sediment-removal port disposed at a bottom region of the reaction chamber, wherein the controller is configured to intermittently open the sediment-removal port to discharge accumulated solids.

\* \* \* \* \*